N. Silvester,
Horse & Cattle Poke.

No. 71916

PATENTED
DEC 10 1867

Inventor
Nelson Silvester.

Witnesses,
J. H. Burridge
Frank S. Alden.

United States Patent Office.

NELSON SILVESTER, OF WEYMOUTH, OHIO.

Letters Patent No. 71,916, dated December 10, 1867.

IMPROVEMENT IN HORSE AND CATTLE-POKE.

*The Schedule referred to in these Letters Patent and making part of the same.*

TO ALL WHOM IT MAY CONCERN:

Be it known that I, NELSON SILVESTER, of Weymouth, in the county of Medina, and State of Ohio, have invented certain new and useful Improvements in a Horse and Cattle-Poke; and I do hereby declare that the following is a full and complete description of the same, reference being had to the accompanying drawings making a part of this specification, in which—

Figure 1:
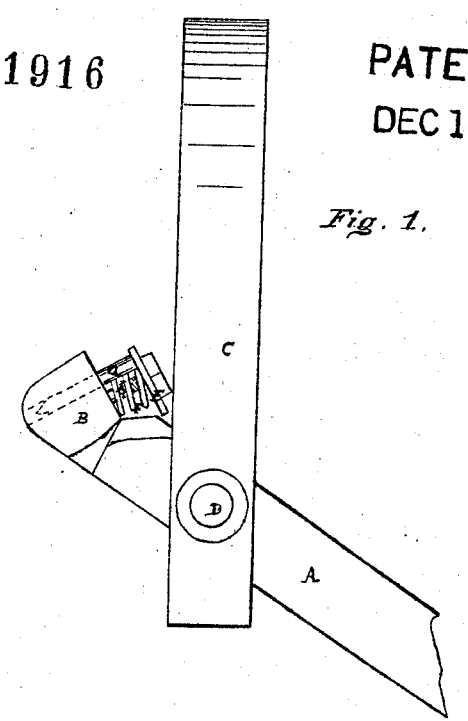
Figure 2:
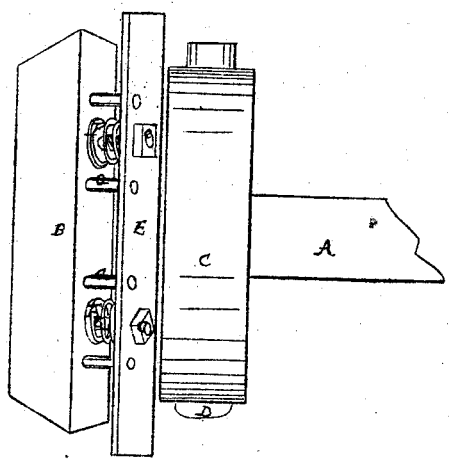
Figure 3:
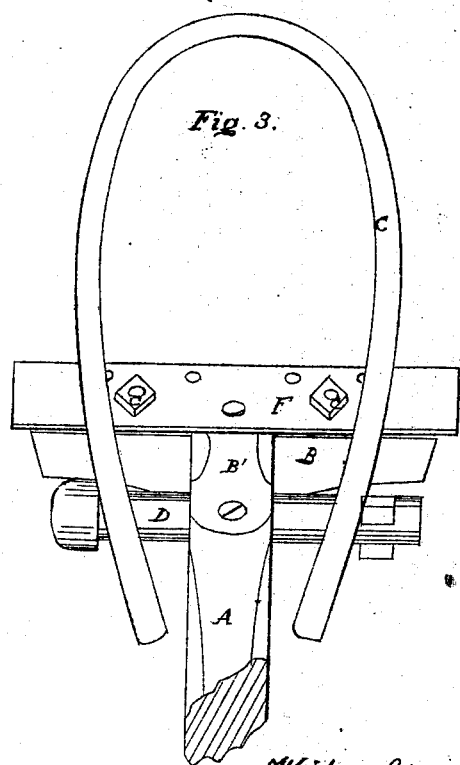

Figure 1 is a side view of the poke.
Figure 2 is a top view.
Figure 3 is a front view.
Like letters of reference refer to like parts in the views.

In the drawings, A represents a poke to which is secured the iron head B by means of the plate B'. C is the yoke which is placed round the neck of the animal, the ends being secured by means of the pin D, which extends through the poke A, as shown in fig. 3. E represents a cross-bar placed in line with and a short distance from the head B. In one edge of this bar are secured the spikes $a$, which may be more or less in number, as desired, which extend down through the head B, in which holes are made for that purpose. Near each end of this cross-bar are the bolts $b$, secured by means of the nuts $c$. F are springs coiled around these bolts, the ends of said springs resting in openings cut in the head B for that purpose.

The poke, when used, is adjusted on the horse or other animal, the yoke being placed over the neck and the ends secured as stated, by means of the pin D. As the animal on which the yoke is placed comes near a fence, the end of the poke will strike against said fence, and thus cause the cross-bar E to press against the yoke C, forcing it towards the head B, and thus push the spikes through the head, the ends of the spikes coming against the breast of the animal, thereby preventing it from leaping over or pushing down the fence. As soon as the end of the poke is removed from the fence, the springs F will force the cross-bar back in place, and thus draw the spikes back into the head B.

What I claim as my improvement, and desire to secure by Letters Patent, is—

1. The head B, cross-bar E, in combination with the springs F and spikes $a$, for the purpose and in the manner substantially as set forth.

2. The cross-bar E, as arranged in relation to the yoke C, and in combination with the poke A, in the manner as and for the purpose specified.

NELSON SILVESTER.

Witnesses:
W. H. BURRIDGE,
FRANK S. ALDEN.